Aug. 11, 1942.   J. C. D. JENSEN   2,292,378
BRAKE OPERATED SIGNAL SYSTEM
Filed Feb. 28, 1939   2 Sheets-Sheet 1
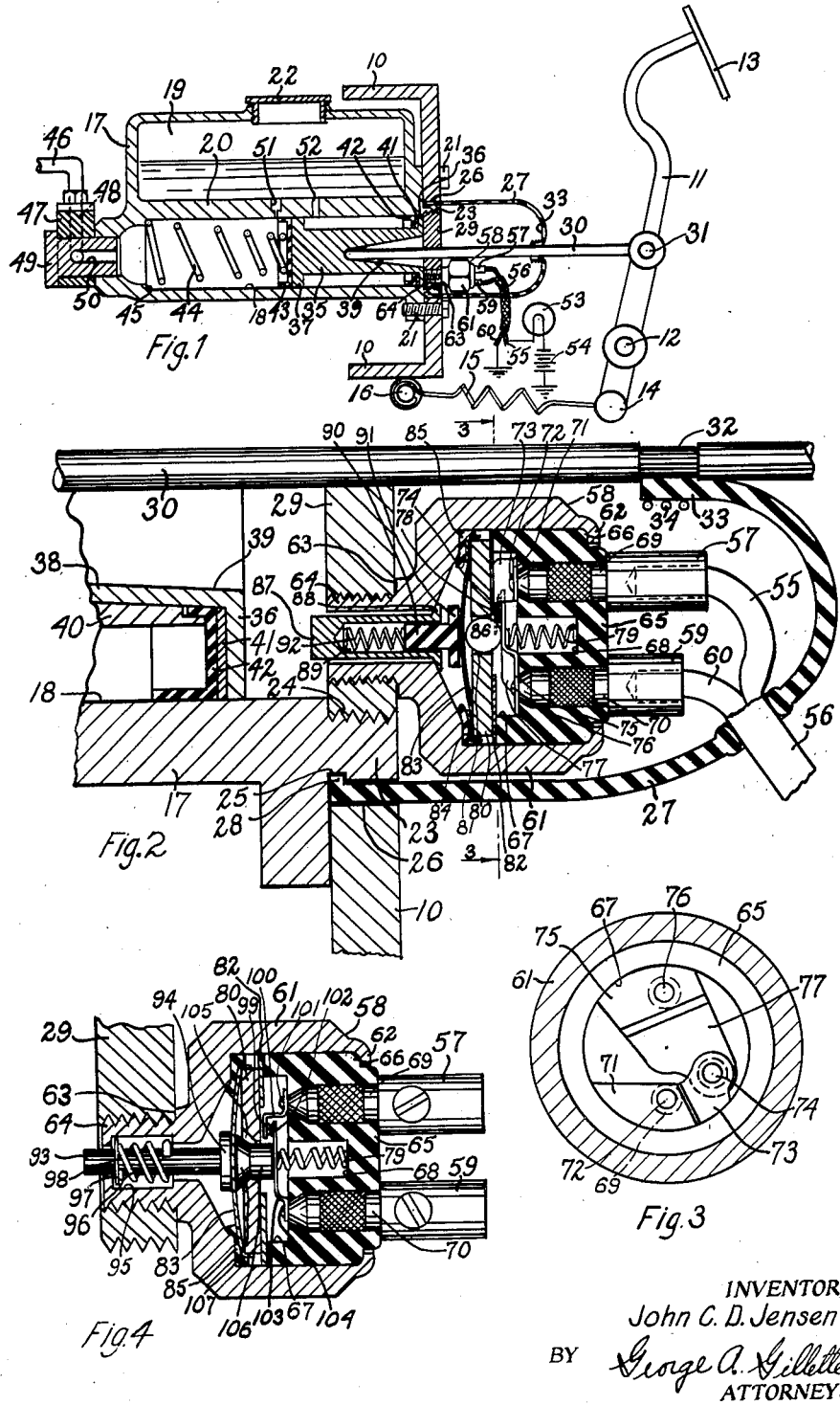
INVENTOR
John C. D. Jensen
BY George A. Gillette Jr.
ATTORNEYS Aug. 11, 1942.    J. C. D. JENSEN    2,292,378
BRAKE OPERATED SIGNAL SYSTEM
Filed Feb. 28, 1939    2 Sheets-Sheet 2
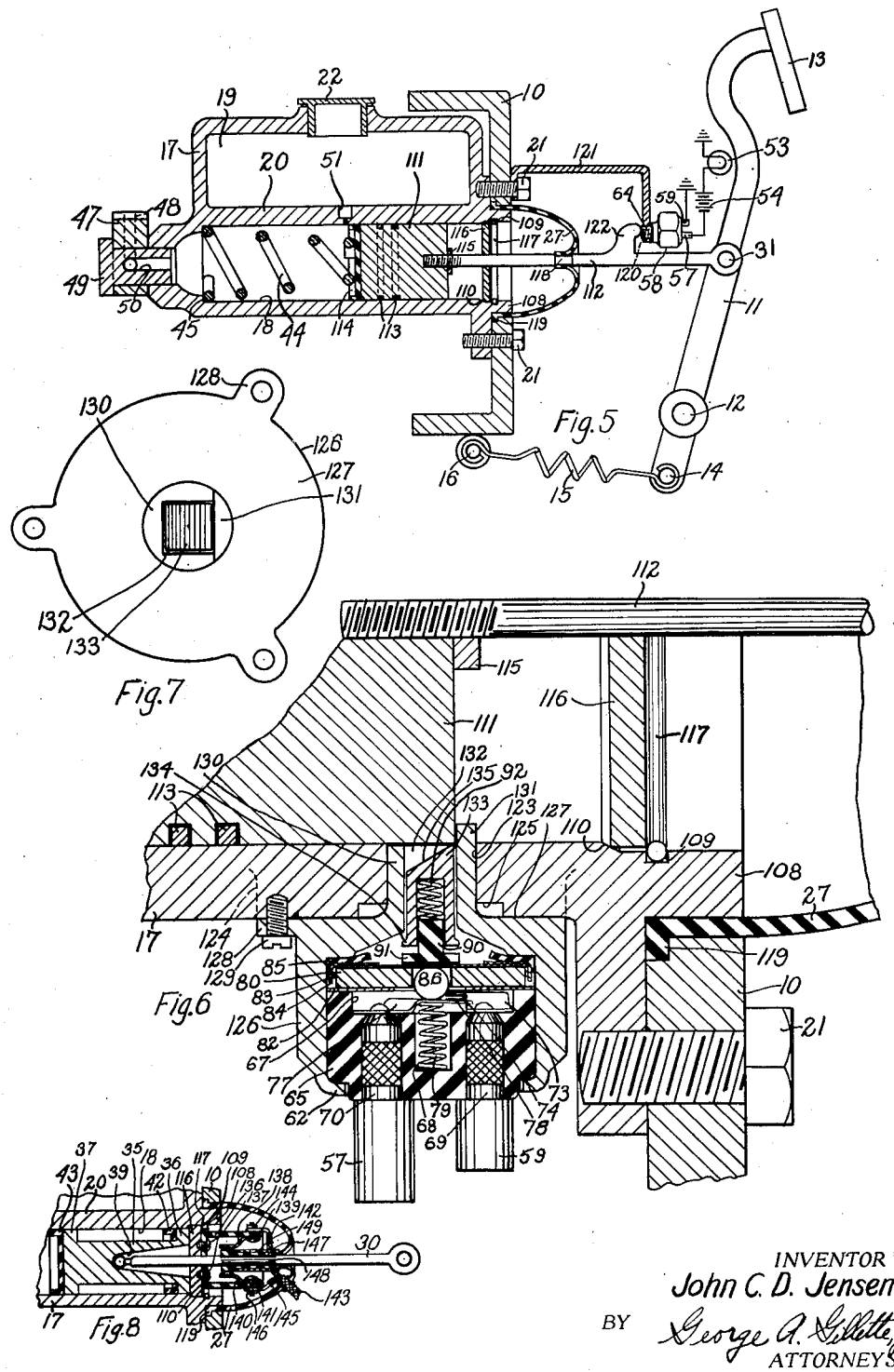
INVENTOR
John C. D. Jensen
BY George A. Gillette, Jr.
ATTORNEYS Patented Aug. 11, 1942

2,292,378

UNITED STATES PATENT OFFICE 2,292,378

BRAKE OPERATED SIGNAL SYSTEM

John C. D. Jensen, Rochester, N. Y., assignor to F. A. Smith Manufacturing Company, Rochester, N. Y., a corporation of New York Application February 28, 1939, Serial No. 259,015

5 Claims. (Cl. 200—82)

The present invention relates to a hydraulic brake system and more particularly to the location of the switch means of a signaling system which is controlled by said brake system.

The use of the master cylinder of an automotive hydraulic brake system to control a stop light signal is well known. However, in such known arrangements the switch means is generally operated hydraulically by the pressure created in the liquid of the brake system and is generally connected to the high pressure side of the master cylinder. As a result, one more possible source of failure is added to the brake system because certain of the several parts of said switch means are placed under very high pressure whenever the brakes are applied and often become fatigued and disrupted in time. In addition, the hydraulic liquid generally used has a highly corrosive action which also in time eats away or accelerates the failure of the switch parts. The serious consequences of the failure of such a stop light switch on the pressure side of the master cylinder are obvious.

The primary object of the present invention is the provision of a signal switch means which is operated by a hydraulic brake system and which controls the signal but which does not jeopardize the reliability of the brake system.

Another object of the invention is the provision of a signal switch means which causes energization of a signal whenever a hydraulic brake system is operated but which is actuated mechanically by the master cylinder of said brake system and which is operated from the low pressure side of said cylinder.

A further object is the provision of a normally closed signal switch means which is open when the hydraulic brake system is inoperative but which is associated with the low pressure side of the master cylinder so as to be closed when the brake system becomes operative.

Still another object is the provision of a signal switch means which is operated mechanically by the piston member of the master cylinder and which is located so that failure or disruption of said switch means does not affect or destroy the operativeness of the hydraulic brake system.

A still further object of the invention is the provision of a normally closed signal switch means which is located on the low pressure side of the master cylinder and which is opened mechanically by the piston member in said cylinder when the braking pressure is released.

Other and further objects of the invention will be apparent or suggested to those skilled in the art by the disclosure which follows.

The aforementioned and other objects of the invention are realized in a hydraulic brake system including a closed cylinder which is divided into a high pressure and low pressure chamber by a piston member, and wherein a signal switch means is associated with said low pressure chamber and/or said piston member so that said switch is closed when the brake system is operative and is opened when said brake system is inoperative.

Reference is hereby made to the accompanying drawings wherein similar reference characters designate similar elements and wherein:

Fig. 1 is a longitudinal section of the master cylinder of a hydraulic brake system showing the preferred arrangement of the signal switch with respect thereto according to the invention.

Fig. 2 is a similar but fragmentary cross-section to enlarged scale and also includes a cross-section of the signal switch.

Fig. 3 is a transverse cross-section of said switch taken on the line 3—3 of Fig. 2.

Fig. 4 is a longitudinal section through a modified form of the signal switch.

Fig. 5 is also a longitudinal section of the master cylinder showing the switch means mechanically operated by the piston rod of the piston member.

Fig. 6 is a longitudinal fragmentary cross-section to enlarged scale of the master cylinder showing the switch means located in one side thereof.

Fig. 7 is an end view of the switch means modified for such location on the side of said master cylinder.

Fig. 8 is a fragmentary cross-section of the master cylinder and a simplified form of switch means operated by the piston rod of the piston member.

In the illustrated embodiments of the invention the arrangement of the signal switch means is shown in connection with one standard or commercial type of hydraulic brake system, however, it is to be understood that the features of the invention may be employed to equal advantage in other known types of hydraulic brake systems.

The hydraulic brake system as shown is mounted upon a frame bracket 10 and basically comprises a pedal assembly and a master cylinder assembly.

The pedal assembly may comprises a pedal arm 11 intermediately pivoted on a shaft 12. Said pedal arm 11 has a foot pad 13 on one end thereof and has on the other end thereof a stud 14 which is connected by a coil spring 15 to a stud 16 on frame bracket 10. As a result the pedal arm 11 and foot pad 13 are resiliently urged in a clock-wise direction.

The master cylinder assembly may comprise a cylinder and reservoir housing 17 which is provided with a cylinder bore 18 and with a liquid reservoir 19 and which has an intermediate wall 20. Said housing 17 is attached at one end to frame bracket 10 by means of bolts 21 and has a cap 22 threaded into the top of housing 17 to permit replenishment of the liquid supply. Housing 17 may also have an integral collar 23 which has an internally threaded bore 24 and which is provided with an external annular groove 25. The frame bracket 10 is provided with a hole 26 which is somewhat larger in diameter than collar 23. A rubber sleeve 27 having an internal rim 28 has one end thereof clamped between said collar 23 and within the hole 26 of frame bracket 10 with rim 28 within groove 25.

A cylinder head 29 is threaded into threaded bore 24 and is provided with a central opening through which extends the piston rod 30 of a piston member. One end of piston rod 30 is pivotally connected to pedal arm 11 by a pin 31 and said piston rod 30 is intermediately provided with a portion 32 of reduced diameter, see Fig. 2, to which the re-entrant end 33 of rubber sleeve 27 is attached by means of a spring retainer 34.

The piston member also comprises a piston 35 having annular end flanges 36 and 37 which are substantially equal in diameter to the diameter of the cylinder bore 18. Said piston 35 is preferably arranged as shown in Fig. 2 and comprises an inner piston sleeve 38 carrying the flange 36 and provided internally with a flared piston rod seat 39 for receiving the end of piston rod 30 which extends through the central opening in cylinder head 29. An outer piston sleeve 40 makes a press fit with inner sleeve 38 and clamps a washer 41 and rubber U-sectioned piston ring 42 therebetween. A cup-shaped rubber piston ring 43 is pressed against the inner end of piston 35 by one end of a helically coiled spring 44 which has its other end bearing on a seat 45 at one end of cylinder bore 18. Consequently, the piston 35 is normally returned to a definite or predetermined position with its flange 36 abutting against cylinder head 29 when the pressure on the pedal assembly and in the hydraulic liquid is released.

The liquid distribution system is of a standard or well known type and may include individual hydraulically operated brake cylinders, not shown, but connected to the master cylinder by a pipe 46 attached to a collar 47 which is provided with a hole 48 and which is fastened to the other end of cylinder and reservoir housing 17 by a bolt 49 provided with a central bore 50.

An inlet port 51 and an equalizing port 52 are provided in intermediate wall 20. The inlet port 51 has a restricted portion entering the cylinder bore 18 just ahead of the piston ring 43 when the piston 35 is in the normal or predetermined position and permits the liquid in the master cylinder to be replenished by liquid from the reservoir 19 to compensate for liquid accidentally lost from the master cylinder or in the distribution system. As soon as the pedal assembly is operated by exerting foot pressure on foot pad 13, the piston ring 43 moves forwardly covers inlet port 51 and a hydraulic pressure is created within the high pressure chamber of the master cylinder and is distributed throughout the brake system.

The space between the annular flanges 36 and 37 and particularly the space behind the piston 35 after displacement thereof are under little if any positive pressure. Any of the hydraulic liquid that passes the piston ring 43 is returned in a known manner through the equalizing port 52 to the reservoir 19 when the piston 35 is returned to its normal or predetermined position by the spring 44. The piston ring 42 will prevent any appreciable amount of liquid passing the flange 36. Hence, the annular space between flanges 36 and 37 or the space behind the piston 35 after its displacement, or both, constitute a low pressure chamber within the master cylinder.

The signal system comprises a signal, a source of energy and a switch means. The signal is preferably of the visual type, such as a stop-light 53, and has one side connected through the source of energy or battery 54 to ground. The other side of the stop-light 53 is connected through one leg 55 of a wire 56 to one post 57 of a switch means, designated generally as 58, while the other post 59 of said switch means is connected through the other leg 60 of wire 56 to ground.

Three forms of a suitable switch means are disclosed herein, although it is to be understood that any form of switch assembly which includes a pair of contacts and an operating member associated with the low pressure side of the master cylinder and actuated by the return of the piston in the master cylinder to normal or predetermined position is within the scope of the invention.

One form of switch means is shown in Figs. 2 and 3 and comprises a cup-shaped member 61 having on one end an inturned flange 62 and at the other end a shoulder 63 and a threaded nipple 64. The cup member 61 is enclosed by a cover 65 of insulating material which is preferably moldable. Said cover 65 has a shoulder 66 engaged by flange 62 and is provided with a switch recess 67 and with a bore 68. Said posts 57 and 59 each have respective portions 69 and 70 of reduced diameter and having knurled sections and all of which are imbedded or moulded in cover 65.

A pair of contacts, preferably normally closed, are placed within switch recess 67, one contact having a base flange 71 attached to portion 69 of post 57 by a rivet 72 and having a contact arm 73 carrying a contact point 74, the other contact having a flange 75 fastened to portion 70 by a rivet 76 and having a contact arm 77 carrying a contact point 78. A coil spring 79 is placed within bore 68 and normally presses contact arm 77 and contact point 78 into engagement with contact point 74.

A rigid disk 80, preferably of steel, is provided with a central hole 81 and covers the switch recess 67. A washer 82 of dielectric material may be interposed between said disk 80 and the annular rim of cover 65. A concave flexible flanged cap 83 is placed over disk 80 and is preferably composed of phosphor bronze. A second dielectric washer 84 and a compressible dielectric or rubber washer 85 are placed between cap 83 and the adjacent shoulder of cup member 61. A hard ball 86, such as a ball bearing, is movable within the hole 81 of disk 80 and transmits the movement or flexure of cap 83 to contact arm 77 to disengage contact point 78 from contact point 74. The spring 79 opposes such movement, holds ball 86 against cap 83 and normally closes contact points 74 and 78.

An operating member of the switch means normally may extend into the master cylinder on the low pressure side thereof and is located so as to be operated by the piston member when it is returned to its normal or a predetermined position. Such operating member may be of the compensating type as shown in Figs. 2 and 6 or may be of the direct type shown in Fig. 4.

The compensating type of operating member may comprise, see Fig. 2, a sleeve 87 which is movably mounted within nipple 64, which has a collar 88, and which is provided with a bore 89. A plunger 90 extends into bore 89 and has a head 91 bearing against the concave flexible cap 83. A coil spring 92 is placed within bore 89 and tends to eject the plunger 90 therefrom. Said spring 92 is stronger than the combined and opposite resilient effect of cap 83, contact arm 77 and spring 79 so that inward movement of sleeve 87 is immediately transmitted through spring 92 and plunger 90 to the cap 83, ball 86 and contact arm 77 resulting in compression of spring 79. After the contact points 74 and 78 have been opened and cap 83 has been flexed against disk 80, any further inward movement of sleeve 87 will merely cause compression of spring 92. Thus any damage to or excessive pressure upon the internal parts of the switch means are avoided. The springs 79 and 92 may also be proportioned or arranged so that the aforementioned compensation will occur soon after the contacts are opened and whether or not the rigid disk 80 intercedes.

The direct type of operating member, see Fig. 4, may comprise a plunger 93 extending at one end out of nipple 64 and having at its other end a head 94 which bears against the flexible cap 83. The nipple 64 may also be provided with a recess 95 within which is located a spring 96 which encircles plunger 93 and a collar 97 bearing against a pin 98 on plunger 93. As a result, plunger 93 is normally urged by spring 96 to extend out of nipple 64.

The switch means may be optionally modified by mounting one contact point 99 on a contact arm 100 by a rivet 101 which is driven into portion 69 of post 57 and by mounting contact point 102 on a spring arm 103 which is fastened to portion 70 of post 59 by a rivet 104. Also the disk 80 may be provided with a flared opening 105 in which may move a pin 106 having a tapered head 107. The spring 79 holds arm 103 with contact point 102 against contact point 99. When the plunger 93 is moved inwardly, as by the piston member of the master cylinder, the cap 83 is flexed, pin 106 and spring arm 103 are moved to open the contact points 99 and 102.

The axial displacement of plunger 93 is limited by the concavity of cap 83 or distance through which said cap 83 is flexed to abut against disk 80. Since the distance which plunger 93 extends beyond the inner face of cylinder head 29 is greater than such axial displacement of said plunger 93, the normal return of the piston 35 is stopped in a predetermined position by said plunger 93 and disk 80.

The primary feature of the invention is the location of the switch means so that its operating member is mechanically actuated from the low pressure side of the master cylinder of the hydraulic brake system and by the piston member thereof. Several possible locations of the switch means and its operating member are disclosed herein. The switch means may be mounted upon the master cylinder with the operating member of said switch means projecting or extending into the path of the piston member so that said operating member is moved to open the switch means when the piston member returns to its normal or a predetermined position.

One arrangement of the switch means is to thread its nipple 64 into a threaded bore in the cylinder head 29 with the shoulder 63 abutting against the outer surface of said cylinder head 29. In this way accurate location of the operating member with respect to the piston member may be obtained under standard manufacturing conditions. The cylinder head 29 is of known thickness and the projecting ends of sleeve 87 and plunger 93 are spaced from shoulder 63 so as to extend into the low pressure chamber of the hydraulic cylinder the desired distance and so that said sleeve 87 or plunger 93 may be axially displaced sufficiently to open the contact points 74 and 78 or 99 and 102.

Another arrangement of the switch means according to the invention is such that the operating member of the switch means is operated by the piston rod of the piston member. For accomplishment of this form of the invention the construction of the master cylinder may be as already described or may be varied as shown in Fig. 5. For instance, the cylinder and reservoir housing 17 has an integral collar 108 which is provided with a groove 109 and with an opening of slightly larger diameter than cylinder bore 18 so that a shoulder 110 is formed at one end of said cylinder bore 18.

The piston member comprises a piston 111 and a piston rod 112. Said piston 111 carries a plurality of piston rings 113 and a rubber cup 114 is pressed against the inner end of piston 111 by the helical spring 44. The piston rod 112 has one end attached to the outer end of piston 111 as by a threaded connection and a lock nut 115 and the other end of piston rod 112 is connected by a pin 31 to the pedal arm 11. The low pressure end of the cylinder bore 18 is enclosed by a disk 116 which is held against shoulder 110 by a spring retainer 117 within the groove 109 and which is provided with a central opening through which the piston rod 112 extends.

The rubber sleeve 27 has at one end a re-entrant portion which grips a reduced portion 118 of piston rod 112 and has at its other end an outer head 119 which is clamped between the frame bracket 10 and said collar 108.

The switch means 58 may be constructed internally either as shown in Fig. 2 or Fig. 4 or in any other suitable manner and includes a threaded nipple 64 and a normally projecting operating member 120. Said switch means 58 has one post 57 connected to ground through stop light 53 and battery 54 and has its other post 59 connected directly to ground. The switch means is also mounted in a position adjacent the piston rod 112 such as by attachment to a convenient part of the vehicle or preferably by having its nipple 64 threaded into one end of a bracket 121 which has its other end fastened to frame bracket 10 by one of bolts 21.

The piston rod 112 carries a projection 122 which is preferably formed integral with said rod 112 but may be detachably and/or adjustably fastened thereto. Projection 122 engages the operating member 120 of switch means 58 when the piston member is returned to its normal position by the spring 44 upon release of pressure from the pedal assembly. Such return of projection 122 also moves said operating member 120 to open the contacts within switch means 58 and de-energize the signal circuit. If the switch means 58 is of the direct type shown in Fig. 4, the final position of the piston member will be determined by the plunger 93 and disk 80. If the switch means is of the compensating type shown in Fig. 2, then the final position of the piston member will be determined by engagement of the projection 122 either with nipple 64 of the switch means or with the bracket 121.

As a result of such arrangement of the invention, the switch means is not subjected even to a low hydraulic pressure and need not be fluid tight so that the internal construction of the switch means may be considerably simplified and may also be provided as illustrated in Fig. 8. The construction of the master cylinder and piston member need not be changed in any respect for the adaptations of the invention shown in Figs. 5 and 8 which is quite advantageous at all times but especially when the signal system is applied to an existing hydraulic brake system.

As shown in Fig. 8, the master cylinder comprises, as before, the cylinder housing 17 which is mounted upon the frame bracket 10, an intermediate wall 20, and an integral collar 108 which is provided with a groove 109 and with an opening of slightly larger diameter than cylinder bore 18 to form a shoulder 110 against which the disk 116 is held by a spring retainer 117. Also the piston member may again comprise a piston 35 having flanges 36 and 37 and provided with a diverging piston rod seat 39 for receiving the ball-shaped end of piston rod 30 which extends through a central opening in disk 116. A pair of flexible piston rings 42 and 43 are also mounted adjacent the flanges 36 and 37 of said piston 35.

In this form of the invention, see Fig. 8, the switch means comprises a cup-shaped housing 136 of molded insulating material and which may be attached to the disk 116 by a pair of screws 137. A pair of contact members are mounted on housing 136 and may comprise a contact arm 138 fastened by a bolt 139 to a side wall of housing 136, and a contact arm 140 fastened by a bolt 141 to the opposite side wall of housing 136. One leg 142 of a wire 143 is attached to bolt 139 by a nut 144 while the other leg 145 of wire 143 is attached to bolt 141 by a nut 146. The legs 142 and 145 of wire 143 may be attached to the signal system in the manner already disclosed.

The signal circuit is completed by a contact member mounted directly upon the piston rod 30 of the piston member and located to interrupt the circuit when the piston member and piston rod 30 are in a normal definite position, in this case determined by the location of disk 116 and said signal circuit is completed immediately when the piston rod 30 is moved to create a hydraulic braking pressure in the master cylinder. Such a contact member may comprise an insulating bushing 147 pressed onto piston rod 30 and maintained in the desired position thereon by engagement with a longitudinally knurled section 148 of piston rod 30 and may also comprise a contact sleeve 149 which is preferably moulded into bushing 147.

The switch means so located may be protected from dirt and damage by the conventional rubber sleeve 27 which may have at one end an outer bead 119 clamped between collar 108 and frame bracket 10, which may have at the other end a re-entrant portion for tightly gripping piston rod 30, and which is provided with an opening through which wire 143 may extend. Such protection by sleeve 27 eliminates the necessity of covering the open end of cup-shaped housing 136 although if desirable a suitable cover may be provided for said open end of housing 136.

According to still another realization of the invention, the switch means 58 may be mounted on a side wall of the master cylinder from whence its operating member extends into the low pressure chamber of the master cylinder and may also carry an abutment for stopping the return movement of the piston. As illustrated in Fig. 6 the master cylinder may be constructed the same as shown in Fig. 5 except that the housing 17 is provided in its side wall with an opening 123 and preferably has an external boss 124 which is provided with a recess 125.

The internal construction of the switch means may be the same as that shown in Fig. 2 or Fig. 4. It is desirable, however, to modify the switch housing and the projecting end of the operating member. The switch housing 126 has a flat end wall 127 for abutting against the face of said boss 124, has a plurality of lugs 128 through which screws 129 are threaded into boss 124, and has an unthreaded nipple 130 extending into said opening 123. Said nipple 130 may carry an abutment 131 which extends into the low pressure chamber of the master cylinder to limit the return movement of the piston 111 and is provided with a square hole 132 within which a square operating member 133 may move. Said operating member 133 has a rim 134 on its inner end and has its other or projecting end 135 beveled, tapered or otherwise formed so that the return of piston 111 to its normal or inoperative position will move said operating member 133 toward said switch means. Such movement of operating member 133 will exert a pressure on spring 92, plunger 90, cap 83, ball 86 and spring arm 77 and will overcome the effort exerted by spring 79 and spring arm 77 so that contact points 74 and 78 will be separated and the signal circuit will be opened. It is, of course, understood that the cylinder head or other arrangement may be made to limit the return movement of the piston in the master cylinder since the member 133 is not further retracted by additional movement of piston 111, however, it is deemed more convenient to provide such abutment on the nipple of the switch housing so that the final position of the piston 111 is in definite and accurate relation to the operating member 133.

Since many other variations and modifications of the invention are possible, the present disclosure is to be construed in an illustrative sense. The scope of the invention is defined by the claims which follow.

What I claim is:

1. In a hydraulic brake system, the combination with a closed cylinder adapted to contain a liquid, and a piston within said cylinder and dividing the interior thereof into a high pressure chamber and a low pressure chamber, of a switch means mounted upon said cylinder and comprising a pair of contacts which are closed when said piston is moved to create a braking pressure in said high pressure chamber, and an operating member extending into the low pressure chamber of said cylinder and mechanically actuated by said piston to open said contacts when the braking pressure is relieved from said high pressure chamber.

2. In a hydraulic brake system, the combination with a closed cylinder adapted to contain a liquid, and a piston within said cylinder and dividing the interior thereof into a high pressure chamber and a low pressure chamber, of a switch means comprising a casing mounted upon said cylinder and providing two compartments, a diaphragm therebetween, a pair of contacts in one of said compartments and adapted to be closed when said piston is moved to create a braking pressure in said high pressure chamber, and an operating member in said other compartment, normally extending into the low pressure chamber of said cylinder, and actuated by said piston to open said contacts when the pressure is relieved from said high pressure chamber of said cylinder.

3. In a hydraulic brake system, the combination with a closed cylinder adapted to contain a liquid, and a piston within said cylinder and dividing the interor thereof into a high pressure chamber and a low pressure chamber, of a switch means comprising a casing providing two fluid tight compartments one of which is connected to said low pressure chamber, a pair of normally closed contacts in the other of said compartments, and an operating member in the first mentioned compartment, normally extending into the low pressure chamber of said cylinder, and actuated by said piston, when the pressure is relieved in said high pressure chamber, to open said contacts.

4. In a hydraulic brake system, the combination with a closed cylinder having a removable wall and adapted to contain a liquid, a piston within said cylinder and dividing the same into a high pressure chamber and a low pressure chamber, and a resilient means acting on said piston to return it to a definite position within said cylinder when the pressure is relieved from said high pressure chamber, of a switch means mounted on said wall and comprising a pair of closed contacts, and an operating member normally extending from said switch means into the low pressure chamber of said cylinder, and mechanically actuated by said piston upon its return to said definite position to open said contacts.

5. In a hydraulic brake system, the combination with a closed cylinder having a removable end wall and adapted to contain a liquid, a piston member including a piston dividing said cylinder into a high pressure chamber and a low pressure chamber and including a piston rod extending from said piston through said removable wall of said cylinder, a flexible sleeve connected at one end to said piston rod and at its other end to said cylinder to enclose said removable wall thereof and a resilient means acting on said piston member to return it to a definite position when the pressures in said chambers are substantially equal, of a switch means within said flexible sleeve and comprising a casing mounted on said wall of the cylinder, a flexible diaphragm within said casing and dividing the same into two fluid tight compartments one of which is connected to said low pressure chamber, a pair of normally closed contacts in the other of said compartments, and an operating member in the first mentioned compartment, normally extending into the low pressure chamber of said cylinder when the liquid in the high pressure chamber is under pressure, and actuated by said piston member to open said contacts when said piston member is returned to said definite position.

JOHN C. D. JENSEN.